US008447991B2

(12) United States Patent
Hart et al.

(10) Patent No.: US 8,447,991 B2
(45) Date of Patent: May 21, 2013

(54) CARD AUTHENTICATION SYSTEM (75) Inventors: Annmarie D. Hart, Carson, CA (US); Lawrence R. Meyers, Rancho Palos Verdes, CA (US); Carlos Hernandez, Carson, CA (US); Robert E. Morley, Jr., St. Louis, MO (US); Edward J. Richter, Richmond Heights, MO (US); Ronald S. Indeck, St. Louis, MO (US)

(73) Assignees: Magtek, Inc., Carson, CA (US); Washington Univ., St. Louis, MO (US)

( * ) Notice: Subject to any disclaimer, the term of this patent is extended or adjusted under 35 U.S.C. 154(b) by 1331 days.

(21) Appl. No.: 11/935,980

(22) Filed: Nov. 6, 2007

(65) Prior Publication Data
US 2008/0215887 A1    Sep. 4, 2008

Related U.S. Application Data (60) Provisional application No. 60/857,753, filed on Nov. 6, 2006.

(51) Int. Cl.
*G06F 21/00* (2006.01)

(52) U.S. Cl.
USPC ............................................ 713/185; 726/35

(58) Field of Classification Search
USPC ....... 713/185, 176, 172; 705/44, 64; 235/449, 235/492
See application file for complete search history.

(56) References Cited

U.S. PATENT DOCUMENTS

| | | | |
|---|---|---|---|
| 4,423,415 A | 12/1983 | Goldman | |
| 4,476,468 A | 10/1984 | Goldman | |
| 4,489,318 A | 12/1984 | Goldman | |
| 4,546,352 A | 10/1985 | Goldman | |
| 4,568,936 A | 2/1986 | Goldman | |
| 4,630,845 A | 12/1986 | Sanner | |
| 4,635,054 A | 1/1987 | Goldman | |
| 4,650,978 A | 3/1987 | Hudson et al. | |
| 4,689,477 A | 8/1987 | Goldman | |
| 4,748,679 A | 5/1988 | Gold et al. | |
| 4,752,837 A | 6/1988 | DeLand, Jr. | |
| 4,785,290 A | 11/1988 | Goldman | |
| 4,806,740 A | 2/1989 | Gold et al. | |
| 4,807,287 A | 2/1989 | Tucker et al. | |
| 4,812,903 A | 3/1989 | Wagensonner et al. | |

(Continued)

OTHER PUBLICATIONS

Anil, Jain; Biometrics: Promising Frontiers for emergency indentification market; AMC; Year: 2003; pp. 1-16.*

(Continued)

*Primary Examiner* — Mohammad W Reza
*Assistant Examiner* — Monjour Rahim
(74) *Attorney, Agent, or Firm* — Gabriel Fitch; Loza & Loza, LLP (57) ABSTRACT

A card authentication system. In one embodiment, the invention relates to a method for authenticating a data card having an intrinsic magnetic characteristic and recorded data on the data card, the method including reading information from the data card, the data card information including the intrinsic magnetic characteristic and the recorded data on the data card, encrypting the data card information, sending the encrypted data card information, receiving the encrypted data card information, decrypting a portion of the encrypted data card information, the portion including the intrinsic magnetic characteristic, generating a score indicative of a degree of correlation between the intrinsic magnetic characteristic of the data card information and a stored value, and determining an authenticity of the data card based at least in part on the score.

35 Claims, 6 Drawing Sheets

U.S. PATENT DOCUMENTS

| | | | |
|---|---|---|---|
| 4,837,426 A | 6/1989 | Pease et al. | |
| 4,906,988 A | 3/1990 | Copella | |
| 4,916,294 A | 4/1990 | Goldman | |
| 4,985,614 A | 1/1991 | Pease et al. | |
| 5,023,923 A | 6/1991 | Sanner et al. | |
| 5,177,344 A | 1/1993 | Pease | |
| 5,216,229 A | 6/1993 | Copella et al. | |
| 5,235,166 A | 8/1993 | Fernadez | |
| 5,254,843 A | 10/1993 | Hynes et al. | |
| 5,365,586 A | 11/1994 | Indeck et al. | |
| 5,396,369 A | 3/1995 | Deland, Jr. et al. | |
| 5,408,505 A | 4/1995 | Indeck et al. | |
| 5,428,683 A | 6/1995 | Indeck et al. | |
| 5,430,279 A | 7/1995 | Fernadez | |
| 5,434,917 A | 7/1995 | Naccache et al. | |
| 5,524,072 A | 6/1996 | Labaton et al. | |
| 5,546,462 A | 8/1996 | Indeck et al. | |
| 5,587,654 A | 12/1996 | Indeck et al. | |
| 5,602,381 A | 2/1997 | Hoshino et al. | |
| 5,612,528 A | 3/1997 | Green et al. | |
| 5,616,904 A | 4/1997 | Fernadez | |
| 5,625,689 A | 4/1997 | Indeck et al. | |
| 5,627,357 A | 5/1997 | Cheng et al. | |
| 5,646,621 A | 7/1997 | Cabler et al. | |
| 5,647,003 A | 7/1997 | Pease | |
| RE35,599 E | 9/1997 | Pease | |
| 5,729,230 A | 3/1998 | Jensen et al. | |
| 5,739,517 A | 4/1998 | Hoshino et al. | |
| 5,740,244 A * | 4/1998 | Indeck et al. | 713/176 |
| 5,767,495 A | 6/1998 | DeLand, Jr. | |
| 5,829,743 A | 11/1998 | DeLand, Jr. et al. | |
| 5,838,270 A | 11/1998 | Kiriaki | |
| 5,920,628 A | 7/1999 | Indeck et al. | |
| 5,988,500 A | 11/1999 | Litman | |
| 6,053,406 A | 4/2000 | Litman | |
| 6,098,881 A | 8/2000 | DeLand, Jr. et al. | |
| 6,400,302 B1 | 6/2002 | Amazeen et al. | |
| 6,431,445 B1 | 8/2002 | DeLand, Jr. et al. | |
| 6,470,240 B1 | 10/2002 | Haynes et al. | |
| 6,476,743 B1 | 11/2002 | Brown et al. | |
| 6,535,561 B2 | 3/2003 | Boesch et al. | |
| 6,760,841 B1 * | 7/2004 | Fernandez | 713/172 |
| 6,830,182 B2 | 12/2004 | Izuyama | |
| 6,899,269 B1 | 5/2005 | Deland | |
| 7,051,002 B2 * | 5/2006 | Keresman et al. | 705/44 |
| 7,064,538 B2 | 6/2006 | Kernhof | |
| 7,090,130 B2 | 8/2006 | DeLand, Jr. et al. | |
| 7,210,627 B2 | 5/2007 | Morley, Jr. et al. | |
| 2002/0145050 A1 * | 10/2002 | Jayaratne | 235/492 |
| 2005/0165695 A1 * | 7/2005 | Berardi et al. | 705/64 |
| 2005/0167495 A1 | 8/2005 | Morley, Jr. et al. | |
| 2005/0173530 A1 * | 8/2005 | DeLand et al. | 235/449 |
| 2005/0218229 A1 | 10/2005 | Morley, Jr. et al. | |
| 2006/0059073 A1 | 3/2006 | Walzak | |

OTHER PUBLICATIONS

International Search Report for Application No. PCT/US05/046387 filed Dec. 19, 2005, dated Sep. 28, 2006, mailed Oct. 20, 2006, 3 page.

Written Opinion for Application No. PCT/US05/046387 filed Dec. 19, 2005, dated Sep. 28, 2006, mailed Oct. 20, 2006, 3 pages.

International Search Report for Application No. PCT/US05/046388 filed Dec. 19, 2005, dated Aug. 14, 2006, mailed Oct. 17, 2006, 3 pages.

Written Opinion for Application No. PCT/US05/046388 filed Dec. 19, 2005, dated Aug. 14, 2006, mailed Oct. 17, 2006, 3 pages.

International Search Report for Application No. PCT/US05/046389 filed Dec. 19, 2005, dated Nov. 13, 2006, mailed Dec. 5, 2006, 3 page.

Written Opinion for Application No. PCT/US05/046389 filed Dec. 19, 2005, dated Nov. 13, 2006, mailed Dec. 5, 2006, 3 page.

International Search Report for Application No. PCT/US07/83842 filed Nov. 6, 2007, dated Apr. 11, 2008, mailed May 1, 2008, 2 pages.

Written Opinion for Application No. PCT/US07/83842 filed Nov. 6, 2007, dated Apr. 10, 2008, mailed May 1, 2008, 6 pages.

International Search Report for Application No. PCT/US07/60586 filed Jan. 16, 2007, dated Sep. 12, 2008, mailed Sep. 19, 2008, 3 pages.

Written Opinion for Application No. PCT/US07/60586 filed Jan. 16, 2007, dated Sep. 12, 2008, mailed Sep. 19, 2008, 3 pages.

* cited by examiner

CARD AUTHENTICATION SYSTEM

CROSS REFERENCE TO RELATED APPLICATIONS

The present application claims the benefit of Provisional Application No. 60/857,753, filed Nov. 6, 2006, entitled "CARD AUTHENTICATION SYSTEM", the contents of which are expressly incorporated herein by reference in their entirety.

FIELD OF ART

The present invention relates generally to data card authentication systems and more specifically to data card authentication systems where information concerning inherent repeatable magnetic features of the data cards is securely exchanged between different entities.

BACKGROUND

Data cards are used widely for identification purposes in applications ranging from financial transactions to security and access control. The data stored on a data card is often readily replicable and, therefore, people have been able to manufacture duplicate (or non-authentic) data cards with some ease. In order to combat fraud, information derived from the remanent noise characteristic of a magnetic stripe on a data card has been used to obtain a unique identifier (e.g., one that is extremely difficult to reproduce) that, like a fingerprint, can be used to uniquely authenticate a specific data card. The remanent noise characteristic is a noise-like magnetic field generated by the underlying magnetic medium of the magnetic stripe. The remanent noise characteristic does not change significantly over time and is effectively unique to a specific data card. Processes for extracting remanent noise information and for authenticating data cards using remanent noise information are disclosed in U.S. Pat. Nos. 5,365,586, 5,428,683, 5,740,244, 6,098,881, 6,431,445, 6,899,269, 7,090,130 and 7,210,627, the disclosures of which are incorporated herein by reference in their entirety.

SUMMARY

The invention relates to a card authentication system. In one embodiment, the invention relates to a method for authenticating a data card having an intrinsic magnetic characteristic and recorded data on the data card, the method including reading information from the data card, the data card information including the intrinsic magnetic characteristic and the recorded data on the data card, encrypting the data card information, sending the encrypted data card information, receiving the encrypted data card information, decrypting a portion of the encrypted data card information, the portion including the intrinsic magnetic characteristic, generating a score indicative of a degree of correlation between the intrinsic magnetic characteristic of the data card information and a stored value, and determining an authenticity of the data card based at least in part on the score.

In another embodiment, the invention relates to a system for authenticating a data card having an intrinsic magnetic characteristic and recorded data on the data card, the system including a reader configured to read information from the data card, the data card information including the intrinsic magnetic characteristic and the recorded data, a network coupled to the reader, and a scoring system coupled to the network, the scoring system configured to receive a portion of the data card information encrypted, the portion including at least the intrinsic magnetic characteristic of the data card, decrypt the portion, and provide a score indicative of a degree of correlation between the intrinsic magnetic characteristic of the received data card information and a stored value, wherein an authenticity of the data card is determined based at least in part on the score.

In still another embodiment, the invention relates to a method for providing a score for a data card having an intrinsic magnetic characteristic and recorded data on the data card, the method including receiving information related to the data card, the data card information comprising encrypted information comprising the intrinsic magnetic characteristic and the recorded data on the data card, decrypting a portion of the encrypted information, the portion comprising the intrinsic magnetic characteristic, generating a score indicative of a degree of correlation between the intrinsic magnetic characteristic of the data card information and a stored value.

DETAILED DESCRIPTION

Turning now to the drawings, a federated data card authentication system that includes one or more trusted scoring systems is illustrated. The system is referred to as federated, because often no single system will possess all of the information required to authenticate a data card. Instead, information is exchanged securely between different entities in order to authenticate the data card. In several embodiments, the system includes data card readers that are connected to at least one authentication server via a network. The authentication server is also connected to one or more trusted scoring systems via a secure communication channel or via the network.

The data card readers obtain information from data cards that can be used in the authentication of the data card. In several embodiments, the authentication information includes information concerning the remanent noise characteristic inherent or intrinsic to a magnetic medium (such as a magnetic stripe) on the data card. The authentication server receives the authentication information from the data card reader and attempts to authenticate the data card using the information provided. The remanent noise characteristic can be thought of as a magnetic fingerprint. Processes for extracting remanent noise information and for authenticating data cards using remanent noise information are disclosed in U.S. Pat. Nos. 5,365,586, 5,428,683, 5,740,244, 6,098,881, 6,431,445, 6,899,269, 7,090,130 and 7,210,627.

In several embodiments, the remanent noise characteristic is stochastic in nature. In such case, the magnetic fingerprint can be thought of as a dynamic digital signature. While the fingerprint is essentially unique to a particular magnetic medium and repeatable, each reading of the fingerprint can vary slightly from other readings of the same fingerprint. These variations can be attributable to the stochastic nature of the remanent noise of a magnetic medium. In other cases, the variations can also be attributable to variations in data card readers and parameters of data card reader transactions such as swipe speed or the like.

In a number of embodiments, the authentication process involves providing at least some of the authentication information to a trusted scoring system. When appropriate information is provided to a trusted scoring system in accordance with an embodiment of the invention, the trusted scoring system can issue a score that can be used in the authentication process. The score can be used to decide whether or not to authenticate a particular data card. In several embodiments, the authentication decision making process takes place at a location other than the scoring system. For example, the score can be used by the authentication server, an authorization server, or a transaction terminal to authenticate the data card. In many embodiments, the trusted scoring system returns a score indicative of the degree of correlation between information provided by the data card reader concerning the remanent noise characteristic of a magnetic stripe located on the data card presented during a transaction and stored information concerning the remanent noise characteristic of the authentic data card.

In several embodiments, the federated data card authentication system includes a registration system that registers data card readers. The registration process involves providing the data card reader with an initial encryption key that is known only to the data card reader and the registration entity. The initial encryption key can be unique to a data card reader or user, or the same key can be placed in a limited set of devices. Once registered, a data card reader can request authentication of a data card from an authentication server within the federated system. In embodiments where the authentication server is part of the registration system (e.g., the data card reader was registered by the entity performing authentication), then the authentication server can verify the legitimacy of the authentication request from the data card reader and can decrypt the authentication information.

In embodiments where the trusted scoring system is part of the registration system, then the authentication system can forward the authentication information to the trusted scoring system and the trusted scoring system decrypts the authentication information and generates a score that is influenced by the legitimacy of the device making the authentication request. In some embodiments, the registration server also registers transaction terminals that are coupled to the reader and the network, where the terminals obtain information related to card transactions. In several embodiments, the registration server uses reader identifying information for registering a data card reader. In such case, the reader identifying information can be a combination of a unique encryption key provided to the reader and a unique serial number of the reader. In other embodiments, the reader identifying information can be either the unique encryption key or the unique serial number.

Figure 1:
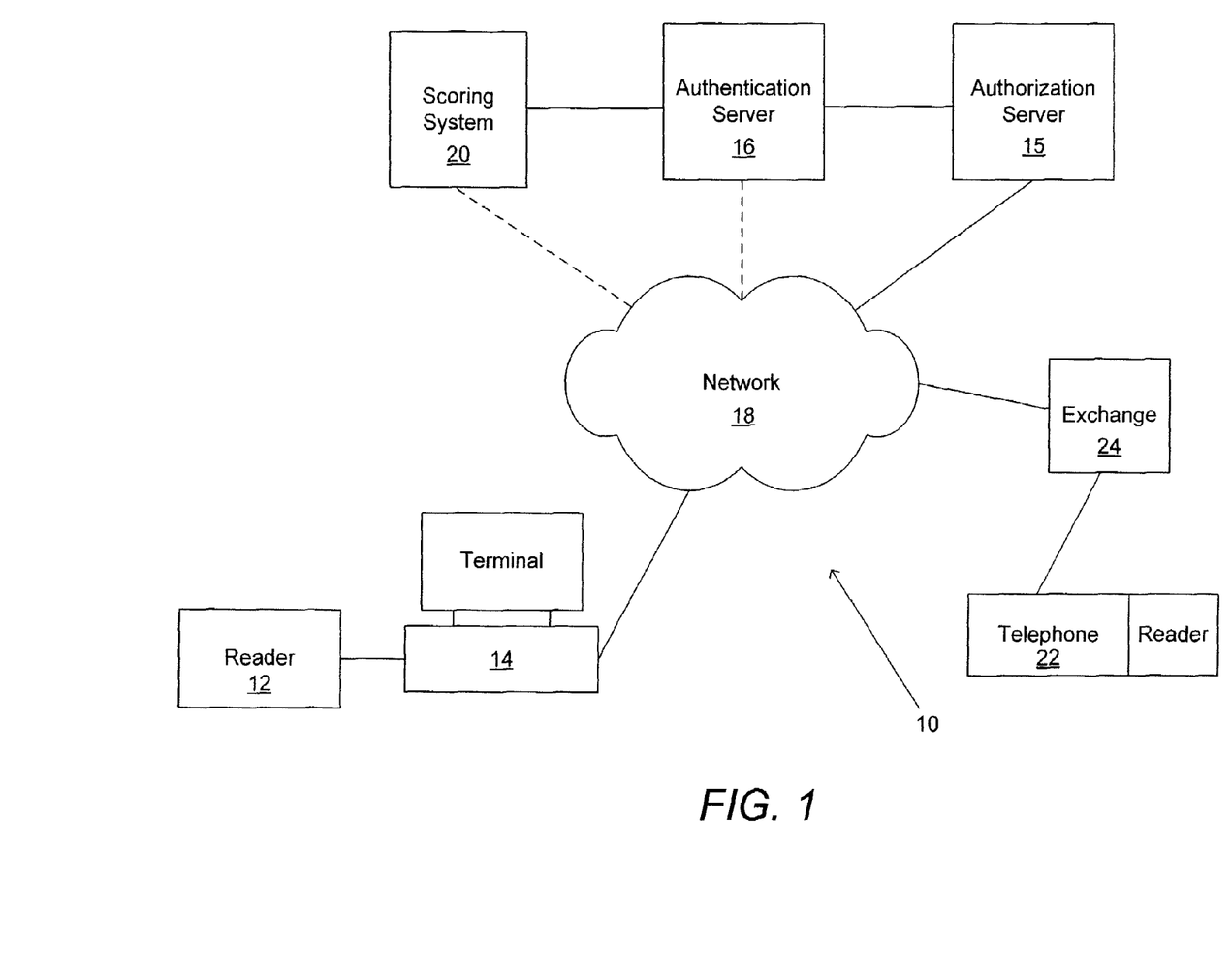
FIG. 1 is a schematic block diagram illustrating a federated data card authentication system in accordance with an embodiment of the invention.

An embodiment of a federated data card authentication system 10 is shown in FIG. 1. The system includes a data card reader 12 connected to a transaction terminal 14, which in the illustrated embodiment is implemented using a computer. In other embodiments, the terminal 14 can be a cash register or other point of sale device. The transaction terminal 14 can communicate with an authentication server 16 via an authorization server 15 and a network 18 or directly via the network 18. The authentication server 16 is also able to communicate with a trusted scoring system 20 over a secured channel or via the network 18. A telephone 22 that includes a data card reader is also connected to an exchange 24. The exchange is connected to the network and the telephone 22 can communicate with the authentication server 16 via the exchange 24 and network 18 and/or authorization server 15. In other embodiments, the telephone communicates with a remote transaction terminal (not shown) and the remote transaction terminal forwards authentication information to the authentication server.

Additional elements of the federated data card authentication system 10 include a registration server, which, in the illustrated embodiment, is implemented using the same server as the trusted scoring system 20. The registration server can be connected to the network either directly or via the authentication server 16. In other embodiments, the registration server can be implemented as a separate server or implemented using the same hardware as the authentication server.

In the illustrated embodiment, the registration server can be used to register data card readers within the federated data card authentication system. In one embodiment, the data card reader can register directly with the registration server. In other embodiments, registration occurs indirectly, for example, via an authentication server or via a transaction system. Registration typically involves establishing some form of secure communication system between the data card reader and the authentication server. In many embodiments, the registration process involves providing the data card reader with information that can be used to generate rotating encryption keys. When rotating encryption keys are used, a different encryption key can be used for each transaction. Examples of suitable secure communication systems include Derived Unique Key per Transaction (DUKPT) or another suitable encryption scheme such as Triple Data Encryption Algorithm (TDEA). In one embodiment, the DUKPT encryption process can include the use of a unique identifier provided by the reader. In such case, the identifier can be a combination of a unique encryption key provided by the reader and a unique serial number of the reader. Once registered, the data card readers can request authorization of data cards from an authentication server 16.

Data card readers in accordance with embodiments of the invention are configured to obtain information that can be used in a transaction to verify the identity of the holder of a data card. The types of transactions that can be authenticated include web based financial transactions, point of sale financial transactions, security transactions and identification transactions. The authentication information can include account information, a PIN and information concerning the remanent noise characteristics of a magnetic medium on the data card. The authentication information obtained by the data card reader is at least partially encrypted prior to being provided to an authentication server. In many embodiments, this information is supplemented by information such as a user name and password that is provided by the card holder via a user interface in the transaction terminal. The authentication server determines if the data card presented to the data card reader is in fact authentic. As part of the authentication process, the authentication server provides the remanent noise information obtained from the card to a trusted scoring system. The trusted scoring system can then score the remanent noise information using stored information concerning the remanent noise characteristics of the authentic data card. The stored information can be obtained when an authentic data card is initially read and the remanent noise characteristic is recorded. The stored information concerning the authentic data card can be stored locally at the trusted scoring system, stored at an authentication server, stored at a secure data server, or stored at another location remote from the scoring system.

Typically, the remanent noise information of a particular transaction is encrypted and provided securely to the trusted scoring system. The trusted scoring system then provides a score indicative of the degree of correlation between the remanent noise information obtained from the data card by the data card reader during a transaction and the historic remanent noise information obtained from the authentic data card. Once the authentication server has authenticated the data card, the authentication server can provide the score to an authorization server and/or the transaction terminal to decide whether to proceed with the transaction. In many embodiments, the transaction terminal, authorization terminal and authentication server do not have access to the remanent noise information obtained by the data card reader in the clear. In such case, only the reader and scoring system have access to the remanent noise information in the clear.

In many embodiments, a telephone 22 including a data card reader is used to communicate with a remote transaction terminal (not shown) and the data card reader in the telephone obtains authentication information from the data card that can be used in the transaction. The data card reader can interrupt the local loop and transmit data to the remote transaction terminal. The remote transaction terminal then provides the authentication information to an authentication server in order to obtain authorization to proceed with the transaction. In one embodiment, the remote transaction terminal is the authorization server 15. In other embodiments, other types of transactions can be authenticated using any of a variety of authentication information presented in the clear, presented in an encrypted form or presented in a partially encrypted form. In one embodiment, the telephone is a cellular telephone. In such case the cellular telephone can communicate wirelessly via the exchange with the remote transaction terminal. In some embodiments, the telephone communicates with the remote transaction terminal without the exchange.

As discussed above, data card readers in accordance with embodiments of the present invention can be implemented in any of a number of different forms. Data card readers can be stand alone readers or can be integrated into other devices. In many embodiments, the data card readers include a magnetic read head in order to obtain information from a magnetic medium such as a magnetic stripe on the data card. In a number of embodiments, the data card reader includes a set of contacts enabling communication with a microprocessor located on the data card and/or an antenna configured to communicate with an RF identification device located on the data card. An embodiment of a data card reader in accordance with the invention is disclosed in U.S. Provisional Patent Ser. No. 60/758,673, the disclosure of which is incorporated by reference herein in its entirety.

The transaction terminal shown in FIG. 1 is implemented using a computer. In many embodiments, the computer accesses a remote website and the combination of the computer and the remote server constitute the transaction terminal. In other embodiments, the transaction terminal includes a point of sale device. FIG. 1 also shows a telephone that incorporates a data card reader. In embodiments where the data card reader is incorporated into a telephone, the transaction terminal includes the telephone and a remote system. The remote system may be a human operator or can be an automated system such as an automated telephone banking system. In other embodiments, other types of transaction systems are used that are capable of receiving information either directly or over a network from a data card reader and to communicate either directly or via a network with an authentication server. In a number of embodiments, the authentication server is also the transaction terminal.

The authorization server 15 can be implemented using one or more servers configured to handle the volume of secure authentication and authorization requests expected within the authorization system. In many embodiments, the authorization servers are mirrored, redundant and/or fail over. In addition, authorization servers are typically located within secure facilities. In several embodiments, the authorization servers are operated by merchants or banks or the like. In one embodiment, the authorization server is a web server capable of handling numerous transactions via the internet. In many embodiments, the authorization server authorizes data card transactions. In such case, the authorization server verifies information related to transactions with data cards. For example, the authorization server might verify the card identification number, the card user's name, available credit and/or any other information relevant to the authorization of the particular transaction. The authorization server typically forwards card authentication information to the authentication server to determine the authenticity of the data card.

The authentication server 16 can be implemented using one or more servers configured to handle the volume of secure authentication requests expected within the authentication system. In many embodiments, the authentication servers are mirrored, redundant and/or fail over. In addition, authentication servers are typically located within secure facilities. In one embodiment, the authentication server and authorization server functions are performed using the same machine/server. In another embodiment, the authentication server is combined with the terminal. In a further embodiment, the authentication server and scoring system are combined within the same machine/server.

The network 18 can take on any of a variety of forms including wired and/or wireless voice and/or data networks. In many embodiments the network includes the internet. In some embodiments, the network can contain any number of interconnected network components and/or secured channels.

The trusted scoring system 20 can essentially be a black box that responds to instructions in known ways without revealing any information about the processes it performs. Trusted scoring systems can be implemented in a number of ways. Several embodiments of trusted scoring systems are implemented using secure software that is tamper resistant. Such software can include code that employs code obfuscation, self modifying code, encrypted code segments, anti-debugging, code integrity, hardware monitoring, split-keys, and/or kernel/driver authentication. In many embodiments, secure hardware is used to implement trusted scoring systems. Examples of such hardware include hardware securely encased in a housing such that the hardware is rendered inoperable and/or important information is erased from memory in the event that the housing is opened without authorization. In many embodiments, trusted scoring systems use system-level security including firewalls, network and host-based intrusion detection, system hardening, two-form authentication, physical security (such as secure data centers, security cameras, locked computer racks, physical access control, access logs, etc.) and cascaded network architectures.

In another aspect of the invention, the data card reader 12 and registration server 20 can engage in a challenge response mutual authentication (CRMA) process that verifies the authenticity of both the reader and the registration server so that secure communications can be executed. In other embodiments, the data card reader and/or transaction terminal engage in a CRMA process with the registration server 20 and/or the authentication server 16. Once the authenticity of the server has been established, the card reader can indicate to the user of the reader, using a visible, audible or tactile indicator, that the remote server or website is authentic. In several embodiments, the indicator is positioned on the housing of the card reader. In one embodiment, the indicator is a light emitting diode (LED). In another embodiment, the data card reader and registration server or their equivalents engage in the CRMA process described in U.S. Provisional Patent Ser. No. 60/886,810, the disclosure of which is incorporated by reference herein in its entirety.

Figure 2:
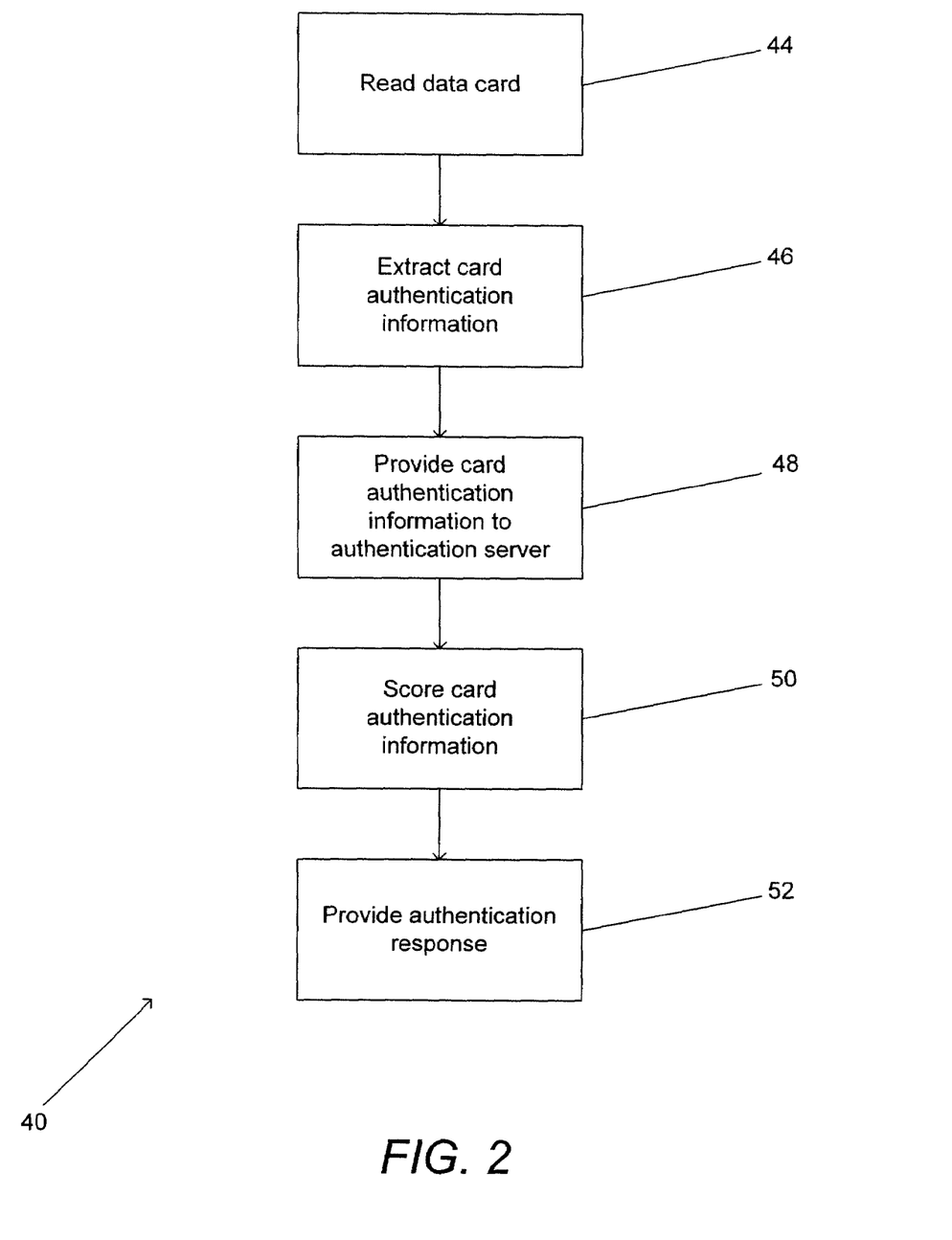
FIG. 2 is a flow chart illustrating an overview of a process for authenticating a specific data card in accordance with an embodiment of the present invention.

An overview of a process in accordance with the present invention for authenticating a data card is shown in FIG. 2. The process 40 begins when the data card reader reads a data card (44). Card authentication information is extracted (46) from the data card and provided (48) to the authentication server. The card authentication information is then scored (50). The scoring can be performed at the authentication server or performed remotely using a trusted scoring system. The score is then used in making a decision concerning the authenticity of the card and that decision can be communicated (52) to the data card reader, a transaction terminal associated with the data card reader, or an authorization server.

In a number of embodiments, the data card reader is registered prior to reading data cards. When a data card reader is registered, the registration server creates an account containing information about the registered device. In many embodiments, the device registration account contains identification information for the device and information for communicating securely with the device such as a transaction counter. In a number of embodiments, the registration server maintains additional information such as information concerning the owner of the data card reader and the IP address from which information obtained by the data card reader is transmitted. In many embodiments, the owner of the data card reader can define a set of authorized IP addresses. In such case, the data card reader is allowed to provide information from one of the authorized IP addresses to an authentication server.

In several embodiments, data cards are registered before general use with readers. A card registering device can read the intrinsic magnetic characteristic of a data card and associate the information with an assigned card identification number or other account information. This information can be stored with the scoring system or on another secure server.

Figure 3:
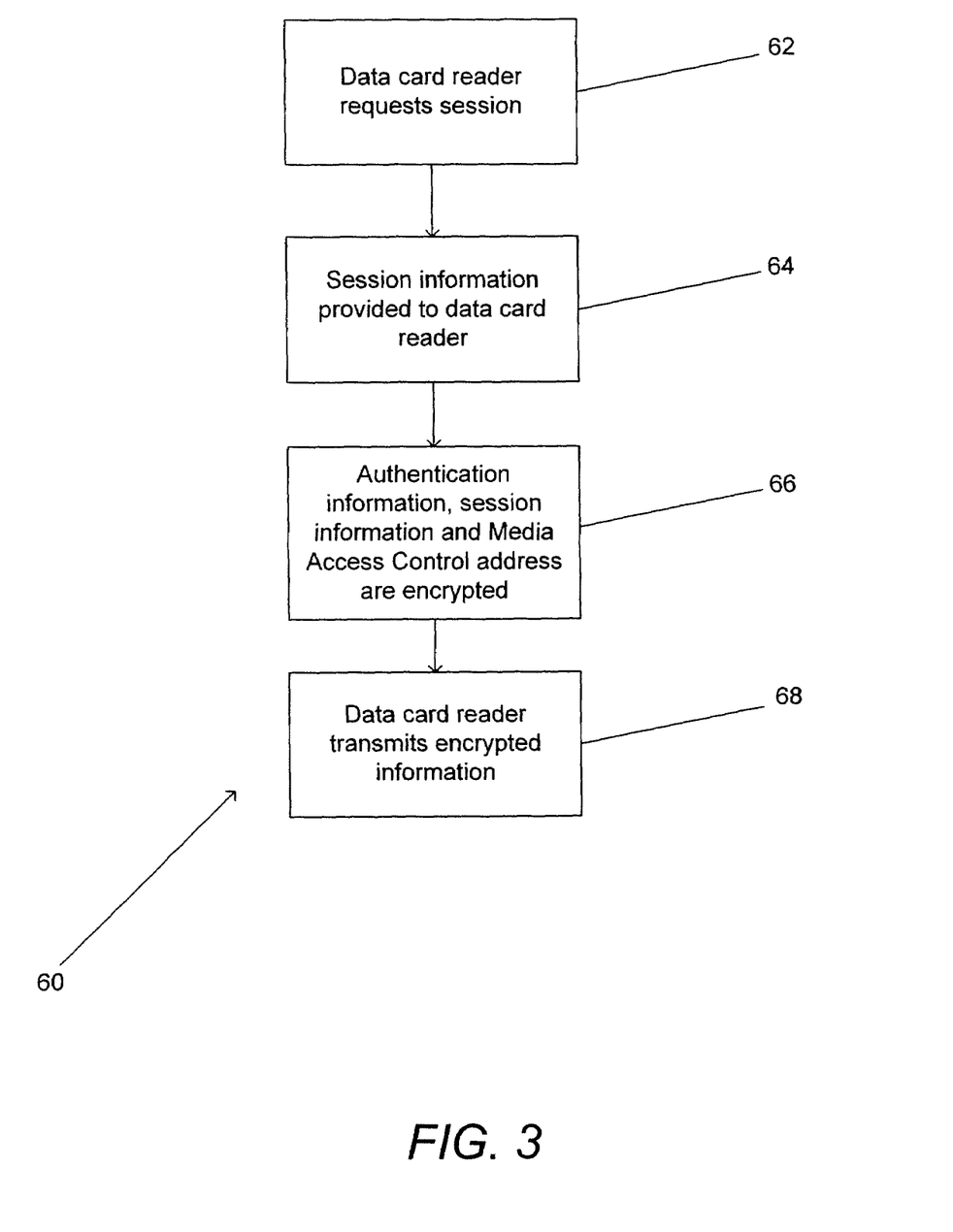
FIG. 3 is a flow chart illustrating a process for transmitting authentication information from a data card reader to an authentication server in accordance with an embodiment of the invention.

When a card reader has been registered, the reader can then obtain authentication information from a data card and securely transmit the authentication information to an authentication server. A flow chart showing a process by which a data card reader and an authentication server can communicate authentication information as part of an authorization request in accordance with an embodiment of the invention is shown in FIG. 3. The process 60 includes the data card reader (or a transaction terminal) contacting an authentication server and requesting (62) a session with the authentication server. The authentication server responds by providing (64) session information to the data card reader. In many embodiments the session information is acquired prior to the data card reader capturing authentication information. In other embodiments, the session information can be obtained after the authentication information has been obtained by the data card reader. The data card reader then encrypts (66) at least some of the extracted authentication information, the session information and the Media Access Control address of the reader. The data card reader then transmits (68) the encrypted information (often with additional unencrypted information, some of which can be separately utilized by the transaction terminal) to the authentication system.

In several embodiments, the transaction terminal is the device that coordinates the transfer of information between the data card reader and the authentication system. In one embodiment, the transaction terminal and/or the card reader engage in a CRMA process with the authentication system. In a number of embodiments, the transaction terminal also provides transaction information to the authorization server. In several embodiments, the authorization server authorizes the card transaction based on the transaction information. For example, the authorization server can provide information related to the validity of the card identification number and/or limits on the available credit for a card.

When information is exchanged in the manner illustrated in FIG. 3, the session information in any transmission from a data card reader must correspond to the session information provided by the authentication server. In addition, timeouts can be used to ensure that session information is only valid for a sufficient time to complete an authentication transaction. When session information is generated by an authentication server, the session information can be loaded into a session table that contains information concerning a time out period, the state information of the data card reader and the IP address of the data card reader. Devices such as authentication servers can use this information to track a session with a data card reader and to detect attempted fraud.

The nature of the encryption used to secure the transmissions between the data card reader and the authentication server depend upon the nature of the system. In many embodiments, DUKPT encryption is used. Although in other embodiments, other encryption techniques can be used. In several embodiments, the data card reader performs the encryption of some of the authentication information and other information is provided in the clear for use by a device such as a transaction terminal. Examples of embodiments of data card readers that encrypt portions of authentication information and provide some information in the clear are disclosed in U.S. Provisional Patent Ser. No. 60/758,673, disclosure of which is incorporated herein in its entirety. An example of a format that can be used in accordance with an embodiment of the invention to provide encrypted information and information in the clear to an authentication server is shown on page 14 of Exhibit A to U.S. Provisional Patent Ser. No. 60/857,753.

Figure 4:
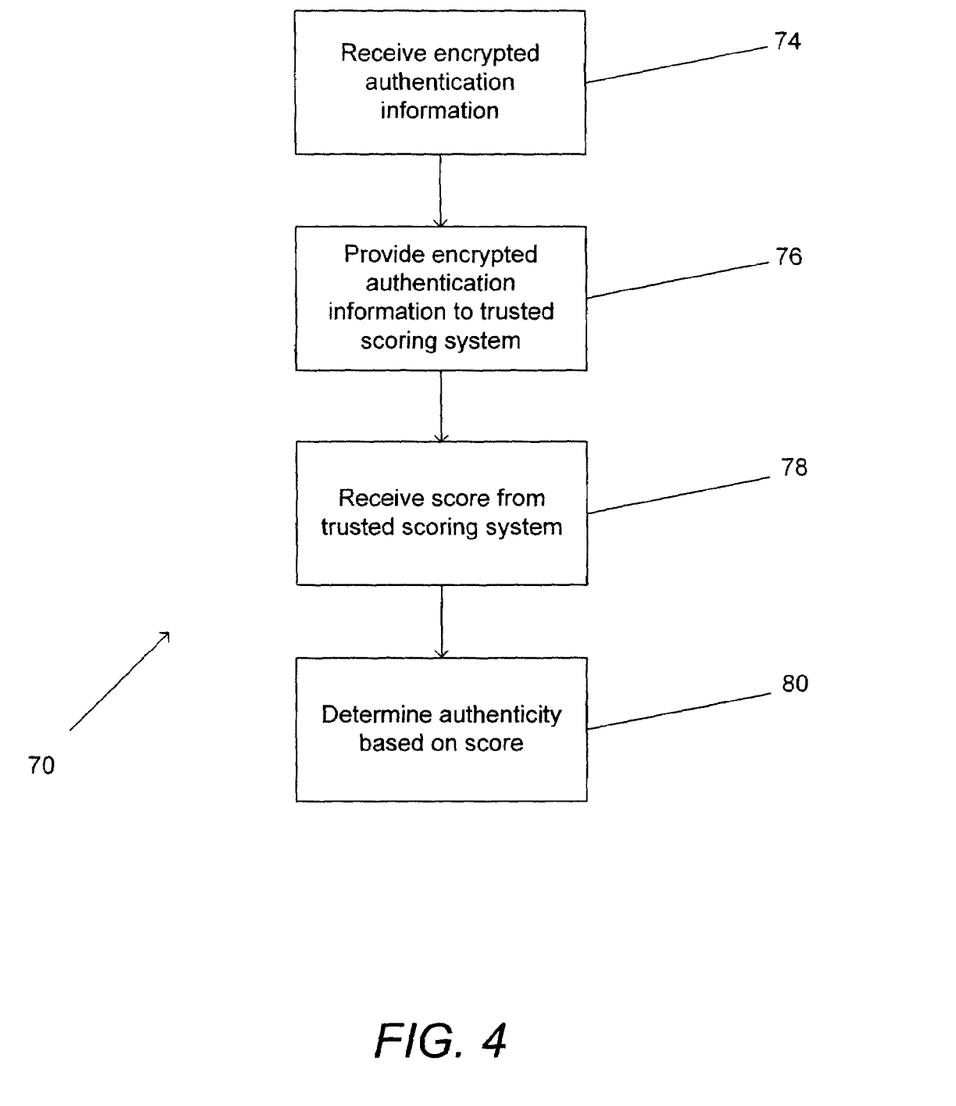
FIG. 4 is a flow chart illustrating a process for exchanging encrypted information between an authentication server and a trusted scoring system in accordance with an embodiment of the invention.

As discussed above, authentication servers in accordance with embodiments of the invention typically provide at least some of the encrypted information to a trusted scoring system. A process for providing encrypted information to a trusted scoring system and for receiving a score from the trusted scoring system is shown in FIG. 4. The process 70 includes receiving (74) encrypted authentication information from a data card reader. The authentication information is provided (76) to a trusted scoring system. In many embodiments, the information provided to the trusted scoring system is provided in an XML format. The process receives (78) a score from the trusted scoring system and determines (80) the authenticity of the data card presented to the data card reader.

In many embodiments, the score that is provided to the authentication system is provided in an XML format.

In order for the trusted scoring system to generate a score for the authentication server, the trusted scoring system typically requires access to information concerning the data card that enables authentication. In many embodiments, this information is stored locally at the trusted scoring system. In other embodiments, the authentication information is stored with the authentication server or at another remote location. In many embodiments, a portion of the information extracted from a data card by a data card reader is provided to the authentication server in the clear and at least part of this information (such as a portion of a Primary Access Number (PAN)) is used to index information concerning the data card. In many embodiments where a portion of the PAN is provided in the clear, a sha-256 hash of the PAN can be used to index information concerning a particular data card. In other embodiments, other organizational structures and data accessing techniques can be used to locate information concerning a particular data card.

Although the process shown in FIG. 4 shows the trusted scoring system providing a score to the authentication server, in many embodiments the trusted scoring system simply unencrypts the authentication information and securely provides the unencrypted authentication information to the authentication server or authorization server. Often, such secure communication between the authentication server and the trusted scoring system is performed over secondary or private secured communication channels. In several embodiments, the trusted scoring system does more than simply provide scoring to the authentication system. In such embodiments, the trusted scoring system returns information to the authentication system indicating whether the data card is authentic.

Figure 5:
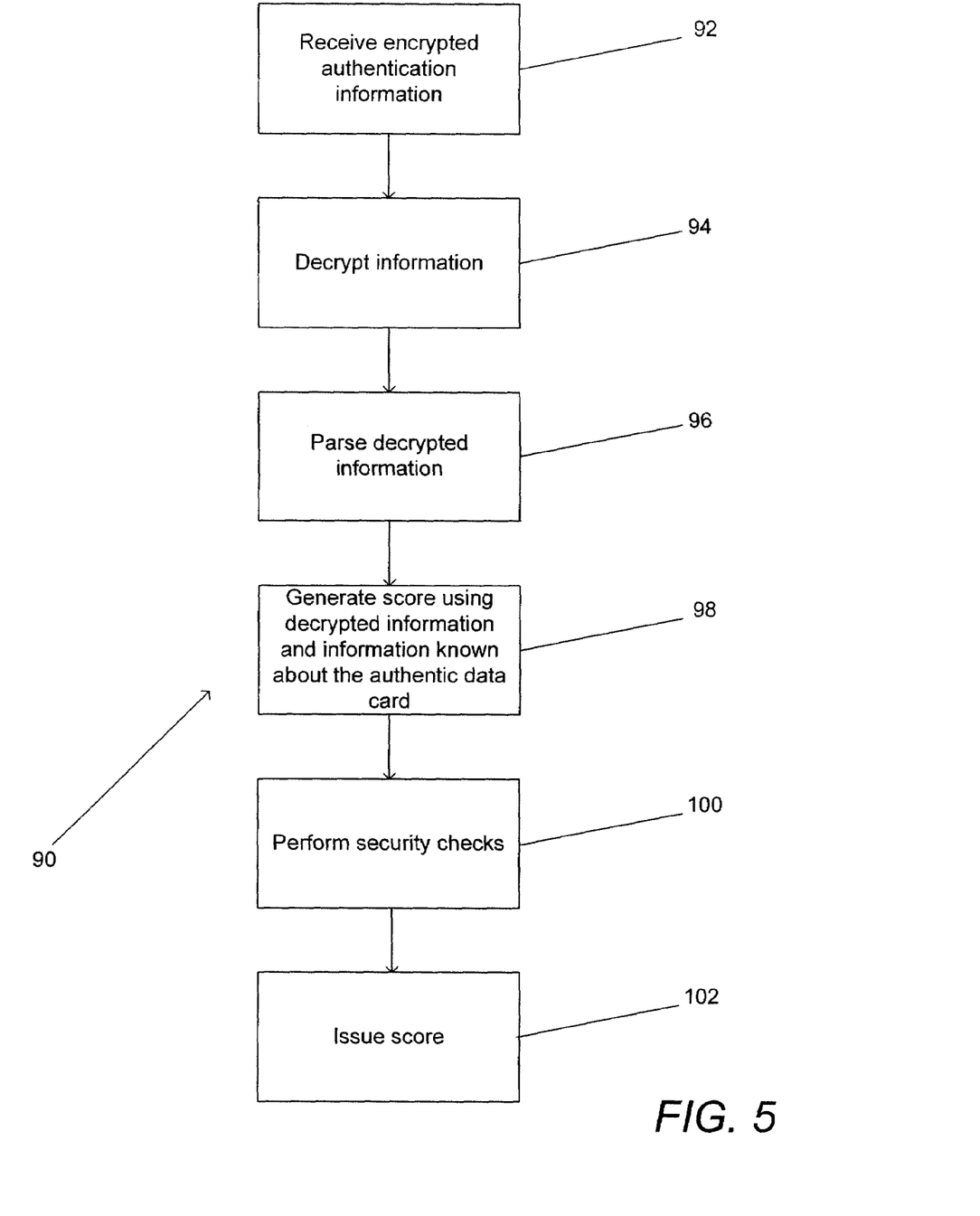
FIG. 5 is a flow chart illustrating a process for scoring encrypted authentication information in accordance with an embodiment of the invention.

An embodiment of a process that can be used by a trusted scoring system to score authentication information provided by an authentication server in accordance with an embodiment of the invention is shown in FIG. 5. The process 90 includes receiving (92) encrypted authentication information. The encrypted information is then decrypted (94) and parsed (96) to extract different components of the authentication information. The authentication information is then compared to known information concerning the data card and a score is generated (98).

In embodiments where the authentication information includes remanent noise information obtained from a magnetic medium located on the data card, then the scoring process includes comparing the remanent noise information obtained in conjunction with a transaction (transaction fingerprint) to stored information (reference fingerprint) concerning the remanent noise characteristics of the magnetic medium of the data card. In several embodiments, the comparison involves a measurement of the degree of correlation between a transaction fingerprint and a reference fingerprint. In one embodiment, the score is a numerical value that ranges between 0 and 100. In another embodiment, the score ranges between 0 and 1. In many instances, an automatic fail is generated when the transaction fingerprint is exactly matches the reference fingerprint, as such a high degree of correlation can be viewed as evidence of fraud. In one embodiment, the scoring system indicates an acceptable correlation by issuing a score above a predetermined minimum or threshold. In some embodiments, the scoring process can take into account a correlation between multiple transaction fingerprints. For example, a reader performing multiple reads of a data card that reports identical transaction fingerprints for those multiple reads can be indicative of fraud.

In some embodiments, non-identical reference fingerprints for a particular data card can be stored in different locations. For example, a merchant having a point of sale (POS) terminal can have a reference fingerprint stored for a data card such that the POS terminal can retrieve the reference fingerprint from a database. At the same time, a bank can have a non-identical reference fingerprint for the same data card. The scoring process can however positively correlate the merchant's reference fingerprint and the bank's reference fingerprint. In several embodiments, none of the magnetic fingerprints taken from a data card exactly match. In such case, a certain degree of correlation between fingerprints establishes authenticity.

In several embodiments, the score is based on a variety of factors. In one embodiment, the score can be based on the entity facilitating the transaction. In such case, the scoring process can take into account the location of entity (e.g. city, county, and/or state). The scoring process can also take into account the type of merchant. For example, certain merchants can require a higher degree of correlation than others. In some embodiments, the score generated for a data card is a function of a score assigned to the associated reader, a score assigned to the associated transaction terminal, and/or a score assigned to the transaction.

In addition to authenticating the data card, the trusted scoring system can also authenticate the reader (if the reader has not already been authenticated by the authentication server). Following the generation of a score that can incorporate a variety of different tests, a series of security checks are performed (100). In many embodiments, the security checks include verifying that the transaction information has not been used before and that the frequency of requests emanating from a particular Media Access Control address does not indicate fraud. Following the completion of the security checks, a score is issued (102) by the trusted scoring system. As indicated above, the score is typically provided in a secure fashion in an XML format.

Figure 6:
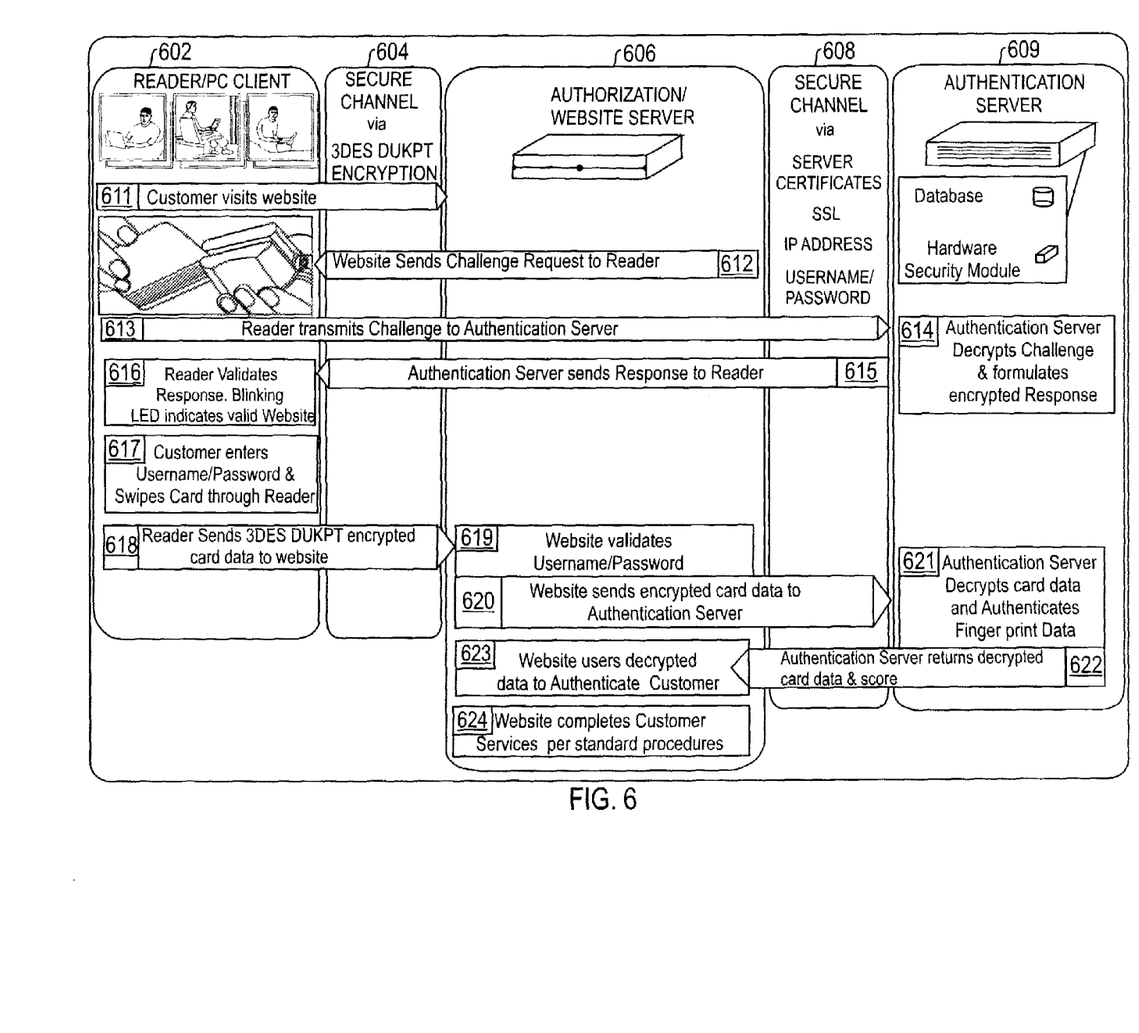
FIG. 6 is a flow chart/block diagram illustrating a system and a process for authenticating a reader and a data card in conjunction with a web transaction and in accordance with an embodiment of the invention.

A flow chart/block diagram illustrating a process and a system for authenticating a reader and a data card in conjunction with a web transaction and in accordance with an embodiment of the invention is shown in FIG. 6. The system includes a reader/PC client 602 coupled by a secure channel 604 to a authorization/website server 606. The website server 606 is coupled by another secure channel 608 to an authentication server 609. The secure channel 604 can use triple DES DUKPT encryption techniques to secure the channel. In other embodiments, other methods of encryption can be used to secure the channel 604. The secure channel 508 can use any combination of server certificates, secure sockets layer (SSL), and/or internet protocol (IP) addresses to secure the channel 608.

The process can begin when a customer using the reader/PC client visits (611) the website of the website server. The website can respond by sending (612) a challenge request to the reader. The reader then transmits (613) a challenge to the authentication server. The authentication server decrypts (614) the reader's challenge and formulates an encrypted response. The authentication server then sends (615) the formulated response to the reader. The reader validates (616) the response. A blinking LED on the reader can indicate a valid website. The customer enters (617) the customer's username/password and swipes the data card through the reader. The reader sends (618) triple DES (3DES) DUKPT encrypted card data to the website. The website validates (619) the customer's username/password. The website then sends (620) the encrypted card data to the authentication server. The authentication server decrypts (621) the card data including magnetic fingerprint data and authenticates the magnetic fingerprint data. The authentication server then returns (622), to the website, the decrypted card data and a score indicative of the degree of correlation between the magnetic fingerprint data read from the data card during the transaction and a stored value. The website uses (623) the decrypted data to authenticate the customer and/or customer transaction. The website can then complete (624) the services requested by the customer using standard procedures.

In one embodiment, the process can perform the sequence of actions depicted in FIG. 6 in any order. In another embodiment, the process can skip one or more of the actions. In other embodiments, one of more of the actions are performed simultaneously.

In several embodiments, the username can be an identifier intended for one time use. In such case, the identifier can include the magnetic fingerprint of the data card engaged in the current transaction. In one embodiment, the password can be a value intended for one time use. In such case, the password value can include the magnetic fingerprint of the data card engaged in the current transaction. In another embodiment, the username, password and magnetic fingerprint of the data card engaged in the current transaction can be combined to form a digital signature intended for one time use.

In one embodiment, the reader is configured to output encrypted data including card track data, magnetic fingerprint data, sequence counter data and cyclic redundancy check (CRC) data. In another embodiment, the reader is configured to output unencrypted or clear text data including key serial number data, DUKPT counter data, masked data, CRC data, and reader serial number data.

In another embodiment, the authentication server is also the transaction terminal. In such case, authentication of a card can take place at the transaction terminal. In this example of local authentication, the card authentication information including the intrinsic magnetic characteristics of the data card can be stored in an encoded form (stored reference fingerprint) on the data card. The transaction terminal can receive the intrinsic magnetic characteristic of the card (transaction fingerprint) and stored information including the stored reference fingerprint from the card reader. Using this information, the terminal can perform the scoring process at the terminal. A score indicative of the degree of correlation of the fingerprint read from the card and the stored fingerprint can be generated. Based on the score, the terminal can determine whether or not the card is authentic.

A number of additional embodiments of systems for authenticating data cards are described in Exhibit A of U.S. Provisional Patent Ser. No. 60/857,753.

In another embodiment, the data card reader includes a remote key loading feature which enables a remote server or other computing device to load an encryption key onto the reader. In one embodiment, the authentication system, including the authentication server and/or the trusted scoring system, can enable remote key loading. In one such case, a data card reader can include a secure mode for securely loading encryption keys. Special information provided to the reader can cause the reader to enter the secure mode. In another embodiment, the data card reader can include multiple levels of security. In such case, each different level can correspond to a different degree of security and correspondingly a level of encryption used. In one embodiment, the highest level of security can require that all data received and sent by the reader is encrypted.

In one embodiment, the data card reader is equipped with a means of providing audio, visual or tactile feedback to the user. In a number of embodiments, the feedback can relate to whether the card reader has been authenticated and/or whether a swiped data card has been authenticated. In a number of embodiments, the visual feedback can be conveyed using one or more LEDs. In one embodiment, the audio feedback is conveyed using a speaker.

While the above description contains many specific embodiments of the invention, these should not be construed as limitations on the scope of the invention, but rather as an example of one embodiment thereof. For example, authentication information other than remanent noise characteristics of a magnetic medium can be used in the authentication of a data card in accordance with embodiments of the invention. In addition, the system can be hierarchical in that data cards and readers issued by a particular issuing authority can be authenticated internally and externally issued data cards can be authenticated by the issuer of the externally issued cards. Accordingly, the scope of the invention should be determined not by the embodiments illustrated, but by the appended claims and their equivalents.

What is claimed is:

1. A system for authenticating a data card having an intrinsic magnetic characteristic and recorded data on the data card, the system comprising:
   a reader configured to read information from the data card, the data card information comprising the intrinsic magnetic characteristic and the recorded data;
   a network coupled to the reader;
   a scoring server coupled to the network, the scoring server configured to:
      receive a portion of the data card information encrypted, the portion comprising at least the intrinsic magnetic characteristic of the data card;
      decrypt the portion; and
      generate a score indicative of a degree of correlation between the intrinsic magnetic characteristic of the received data card information and a stored value; and
   a second server coupled to the network and configured to determine an authenticity of the data card based at least in part on the score,
   wherein a location of the scoring server is different from a location of the second server.

2. The authentication system of claim 1, wherein the scoring server is configured to provide a score indicating failure when the intrinsic magnetic characteristic of the received data card information exactly matches the stored value.

3. The authentication system of claim 1, wherein the scoring server is configured to provide the score indicative of a degree of correlation between the intrinsic magnetic characteristic of the received data card information and a plurality of stored values.

4. The authentication system of claim 3:
   wherein the data card information comprises information obtained from at least one reading of the data card;
   wherein the scoring server is configured to provide a score indicating failure when any two values of the intrinsic magnetic characteristic of the received data card information and the plurality of stored values exactly match.

5. The authentication system of claim 1, wherein a score above a preselected threshold is indicative of an authentic data card.

6. The authentication system of claim 1, wherein the intrinsic magnetic characteristic is a remanent noise characteristic.

7. The authentication system of claim 1, wherein the scoring server is further configured to authenticate the reader.

8. The authentication system of claim 1, wherein the scoring server is further configured to authenticate the reader using a mutual authentication process.

9. The authentication system of claim 1, further comprising:
   a terminal coupled to the reader;
   wherein the terminal is configured to:
      encrypt the data card information and transaction information; and
      send the encrypted information to an authentication server coupled to the scoring server.

10. The authentication system of claim 9, wherein the authentication server is configured to:
    authenticate the transaction information;
    send at least a portion of the encrypted data card information to the scoring server;
    receive the score from the scoring server; and
    send the score to the terminal.

11. The authentication system of claim 9, wherein the authentication server is configured to authenticate the terminal based on a Media Access Control address.

12. The authentication system of claim 9, wherein the authentication server is configured to authenticate the terminal using a mutual authentication process.

13. The authentication system of claim 9, wherein the second server is located at the terminal.

14. The authentication system of claim 1, further comprising an authorization server coupled to the scoring server, wherein the authenticity of the data card is determined, at the authorization server, based at least in part on the score.

15. A method for authenticating a data card having an intrinsic magnetic characteristic and recorded data on the data card, the method comprising:
    reading information from the data card, the data card information comprising the intrinsic magnetic characteristic and the recorded data on the data card;
    encrypting the data card information;
    sending the encrypted data card information;
    receiving the encrypted data card information;
    decrypting a portion of the encrypted data card information, the portion comprising the intrinsic magnetic characteristic;
    generating, at a scoring server, a score indicative of a degree of correlation between the intrinsic magnetic characteristic of the data card information and a stored value; and
    determining, at a second server, an authenticity of the data card based at least in part on the score,
    wherein a location of the scoring server is different from a location of the second server.

16. The method for authenticating a data card of claim 15, wherein the generating a score includes generating a score indicative of a failure when the intrinsic magnetic characteristic of the received data card information exactly matches the stored value.

17. The method for authenticating a data card of claim 15, wherein the generating a score includes generating a score indicative of a degree of correlation between the intrinsic magnetic characteristic of the data card information and a plurality of stored values.

18. The method for authenticating a data card of claim 17:
    wherein the data card information comprises information obtained from at least one reading of the data card;
    wherein the generating a score includes generating a score indicative of a failure when any two values of the intrinsic magnetic characteristic of the received data card information and the plurality of stored values exactly match.

19. The method for authenticating a data card of claim 15, wherein the generating a score includes generating a score indicative of an acceptable correlation when the score is above a preselected threshold.

20. The method for authenticating a data card of claim 15, wherein the intrinsic magnetic characteristic is a remanent noise characteristic.

21. The method for authenticating a data card of claim 15, wherein the reading information from the data card comprises reading information from the data card using a reader, the method further comprising authenticating the reader.

22. The method for authenticating a data card of claim 21, wherein the authenticating the reader comprises authenticating the reader using a mutual authentication process.

23. The method for authenticating a data card of claim 15, further comprising:
    providing information related to a card transaction, the transaction information comprising the data card information; and
    authenticating the card transaction based on the transaction information.

24. The method for authenticating a data card of claim 23, wherein the providing information related to a card transaction comprises providing information related to a card transaction using a terminal, the method further comprising:
    authenticating the terminal based on a Media Access Control address.

25. The method for authenticating a data card of claim 23, wherein the providing information related to a card transaction comprises providing information related to a card transaction using a terminal, the method further comprising:
    authenticating the terminal using a mutual authentication process.

26. The method for authenticating a data card of claim 15, wherein:
    wherein the encrypting the data card information and the sending the encrypted data card information are performed at a terminal; and
    wherein the second server is located at the terminal.

27. The method for authenticating a data card of claim 15, wherein:
    wherein the receiving the encrypted data card information is performed at an authorization server; and
    wherein the second server is the authorization server.

28. A method for providing a score for a data card having an intrinsic magnetic characteristic and recorded data on the data card, the method comprising:
    receiving information related to the data card, the data card information comprising encrypted information comprising the intrinsic magnetic characteristic and the recorded data on the data card;
    decrypting a portion of the encrypted information, the portion comprising the intrinsic magnetic characteristic;
    generating, at a scoring server, a score indicative of a degree of correlation between the intrinsic magnetic characteristic of the data card information and a stored value; and
    determining, at a second server, an authenticity of the data card based at least in part on the score,
    wherein a location of the scoring server is different from a location of the second server.

29. The method of claim 28, wherein the score is a numerical value.

30. The method of claim 29, wherein the numerical value is a value with a range from 0 to 100.

31. The method of claim 28, wherein the score is a numerical value in a range comprising at least three values.

32. The method of claim 31, wherein the range comprises a preselected minimum, a preselected maximum, and a preselected threshold.

33. The method of claim 32:
   wherein the second server is located at a merchant, and
   wherein the preselected threshold is determined by the merchant.

34. The method of claim 32:
   wherein the second server is an authorization server, and
   wherein the preselected threshold is determined by the authorization server.

35. The method of claim 34:
   wherein the information related to the data card is received from a terminal located at a merchant.

* * * * *